Patented Jan. 16, 1951

2,538,297

UNITED STATES PATENT OFFICE 2,538,297

HEAT AND LIGHT STABLE VINYL RESIN COMPOSITIONS

Willem Leendert Johannes de Nie, Amsterdam, Netherlands, assignor to Shell Development Company, San Francisco, Calif., a corporation of Delaware No Drawing. Application July 14, 1947, Serial No. 760,927. In the Netherlands July 12, 1944

Section 1, Public Law 690, August 8, 1946
Patent expires July 12, 1964

7 Claims. (Cl. 260—23)

This invention relates to a process for the stabilization of poly(organic halide) compositions against undesirable changes in properties, and to the resulting stabilized compositions. More particularly the invention provides high molecular weight poly(organic halide) compositions having improved qualities of resisting losses of transparency, color, dielectric strength, moisture-resistance, or molecular degradation, upon exposure to heat and/or light. In its most specific embodiment the invention provides improved homogeneous stable plastic intermediates for the preparation of dielectrics and protective materials comprising essentially high molecular weight poly(organic halides) and minor amounts of metal salts of mixed complex organic acids.

The term poly(organic halide) as applied throughout the specification and the appended claims refers to an organic polymer containing halogen atoms attached to atoms of the polymeric molecules, and particularly to polymers containing linear chain-like molecules and which have molecular weights of greater than about 10,000. Suitable poly(organic halides) may be prepared by the polymerization of one or a plurality of monomeric organic halides, by the halogenation of polymers containing reactive groups to which halogen atoms become attached, or by numerous other methods which will be apparent to those skilled in the art. The individual poly(organic halides) may be copolymerized or interpolymerized with any suitable halogen containing or halogen-free monomeric materials and/or mixed with other polymers, asphaltic or natural bitumens, paraffin waxes, natural or artificial gums or resins, plasticizers, solvents, pigments, dyes, fillers and similar plastic compounding ingredients and additives. Illustrative examples of individual poly(organic halides) include, polyvinylbromide or chloride, polyvinylidene bromide or chloride, polyvinyl bromo and/or chloroacetates, polychloroprene, polychlorostyrenes, polybromostyrenes, polyfluoroethylene, poly(alkenyl chloracrylates) and poly(alkyl bromacrylates), all of which compounds may properly be termed "polyvinyl halide resins," as well as the various halo-rubber derivatives, halogenated rubber derivatives, and the like polymeric substances. In general, any polymeric material having a relatively high molecular weight and being subject to decomposition under the influence of elevated temperatures or exposure to light radiations in or approaching the ultraviolet, in which decomposition free halogen or halogen halide is produced and catalytically accelerates the rate of further decomposition, can be markedly improved in resistance to such decomposition by the process of the invention.

For many years the highly adaptable poly(organic halide) plastic compositions have been restricted to applications where they are subject to relatively mild conditions of temperature, exposure to the direct rays of the sun, humid atmospheres, and similar adverse conditions. The problem of eliminating this disadvantage of poly(organic halide) compositions has been approached in many ways, and certain improvements are known to result from the incorporation of additives having a capacity to combine with the released halogen or hydrogen halide. Numerous and widely varied materials have been proposed as stabilizing additives such as the metal salts of aliphatic and aromatic acids, metal phenolates, naphthalates and alcoholates, high molecular weight organic esters, nitrogen containing compounds, ethers, and still other types of compounds. The inorganic salts are generally but slightly soluble in non-ionic organic materials, and usually only the alkali and alkaline earth metal salts of the weak organic acids employed heretofore were sufficiently miscible and compatible with the organic components to remain in intimate mixture with the compositions in quantities sufficient to impart any improvement in stabilization. Many organic additives, which while having the property of combining with the liberated halogen or hydrogen halide and having sufficient solubility and miscibility to remain in intimate contact with the polymers in amounts sufficient to improve the stabilization, have other disadvantages. For example, the employment of certain of such organic additives particularly the nitrogen containing compounds often results in cross-linking between the normally linear polymer chains at the temperatures employed during various steps of the compounding operations. The formation of cross-linking between the linear chains, which occurs particularly with the high molecular weight and non-volatile nitrogen containing compounds such as 1,4-diaminobenzene, tends to convert the polymer from a thermoplastic to a thermo setting character which may render the composition useless for certain applications. Other organic compounds, particularly the esters and ethers, due to their volatility are vaporized or sublimed out of the composition during compounding or over a relatively short period of time thereafter in amounts which greatly reduce their stabilizing effect.

It has now been discovered that by employing certain complex mixtures of metal salts of high molecular weight acids many of the numerous disadvantages inherent in stabilized plastic compositions containing the stabilized additives commonly employed heretofore are avoided. For example, the alkali and alkaline earth metal salts of weak organic acids while they impart certain qualities of improved resistance to the compositions, form water-soluble halogen or hydrogen halide reaction products. The water soluble salts formed within the plastic mass, particularly hygroscopic salts such as calcium chloride, often decrease the resistance to water adsorption and in the presence of moisture tend to form ionized water solutions dispersed in the non-ionic plastic mass of the compositions. For applications in which the properties of moisture resistance or dielectric strength are of primary importance the formation of ionic water soluble salts by the stabilizer as it combines with and prevents the halogen from causing a rapid decomposition of the polymer may even introduce with equal rapidity the undesired changes in properties that would occur in the unstabilized composition. By the present process mixed weak acid salts of metals which do not form water soluble chlorides may be employed to form plastic compositions of even greater homogeneity than those obtainable with the alkali or alkaline earth metal salts of the organic acids heretofore employed. Therefore the compositions stabilized according to the present process are not subject to undergoing a decrease in homogeneity, dielectric or moisture resistant properties after the stabilizer has commenced combining with the halide decomposition products of the polymer.

The present invention may be generally stated as providing stabilized plastic compositions having improved qualities which comprise essentially a high molecular weight poly(organic halide) and a small amount of the complex mixed salts formed by a double decomposition reaction between a salt of normally mono or divalent metals, preferably a metal of the silver group, and the acids produced by the saponification of wool fat, or wool grease, preferably the fraction of the wool fat acids which is soluble in the lower alcohols but insoluble in the lower hydrocarbons. The invention therefore provides a process for stabilizing poly(organic halides) by the addition of a small amount of metal salts of the complex mixture of acids which after "as complete a study as possible," Abraham and Hilditch, J. Soc. Chem. Ind. 54 398–404T (1935) conclude do not contain acids of the normal aliphatic series (myristic, palmitric stearic, and the like) but which they suggest to be derived from an isoprene or terpene foundation rather than from an unbranched chain of carbon atoms.

The metals of the silver group, i. e., the group comprising lead, silver and mercury which by virtue of the water-insolubility of their halide salts are precipitated by dilute hydrochloric acid in the majority of the qualitative analysis schemes, when incorporated into poly(organic halide) compositions in the form of wool fat acid salts, impart particularly valuable properties to the composition. The wool fat acid salts of the silver group metals tend to combine with the photochemically or thermochemically released halide atoms to form extremely insoluble metal halides that are non-hygroscopic and substantially non-ionic, thereby causing no change in the dielectric strength, homogeneity, moisture resistance or similar properties of the composition. The poly(organic halide) compositions containing the wool fat acid salts of the silver group metals thereby exhibit improved qualities of resistance for application as dielectrics and moisture resistant protective coatings, and similar materials must exhibit no change in properties when subjected to the most adverse conditions of heat, light and moisture.

The complex mixed acids obtained by the saponification of wool fat or wool grease vary widely in their physical and chemical properties, and all fractions of the mixed acids do not, in the form of their metal salts, impart the same stabilized qualities to poly(organic halide) compositions. It has been found that when the metal salts of only the fraction of wool fat acids which is soluble in the lower alcohols and insoluble in the lower hydrocarbons is employed, the stabilized compositions exhibit qualities of even greater resistance to changes in properties than the resistance imparted by the metal salts of the wool fat acids as a whole.

The separation of the fraction of wool fat acids which is soluble in the lower alcohols and insoluble in the lower hydrocarbons may be suitably accomplished by any of the commonly employed procedures for the selective solvation and separation of organic materials. For example, the raw wool fat acid mixture obtained by acidifying the aqueous portion of the saponification products of wool fat or wool grease may be simultaneously treated with methyl alcohol and pentane in amounts sufficient to cause the formation of two immiscible liquid layers thus allowing the separation of the desired fraction as a solute in the aqueous alcohol layer. Suitable lower alcohols include methyl, ethyl, propyl and the like alcohols of less than about 5 carbon atoms which have solubility properties similar to those of methanol. Suitable lower hydrocarbons include propane, butane, pentane, hexane, and similar hydrocarbons or hydrocarbon mixtures liquefiable under moderate pressures and having solubility properties similar to those of pentane. The metal salts of this alcohol soluble-hydrocarbon insoluble fraction of wool fat acids unexpectedly exhibit a greater solubility in non-ionic organic solvents than do similar salts of the raw or unextracted wool fat acids. The salts of the alcohol soluble wool fat acids may therefore be employed in substantially larger quantities than the metal salts of organic acids usually employed as stabilizing additives, or even than the metal salts of raw wool fat acids. This improved solubility of the metal salts, even in the case of the salts of the silver group metals, of the alcohol soluble fraction of wool fat acids results in plastic compositions having improved homogeneity, thereby a greater stability of color and dielectric properties against thermochemically or hydratively induced changes in properties.

The stabilized plastic compositions of the present invention, in addition to the high molecular weight poly(organic halide) and the wool fat acid salts may suitably contain or be treated with one or more plasticizers, mineral oils, mold releasing agents, pigments dyes, solvents or other compounding or treating substances suitable for use in the manufacturing of plastic organic compositions. By virtue of their thermal stability and remarkable solubility in non-ionic organic materials, especially in high molecular weight organic materials, the wool fat acid salts may often be homogeneously dissolved in many high molecular weight poly(organic halide) materials which are plasticized by heat alone. This is most often the case with the salts of only the alcohol-soluble hydrocarbon-insoluble fraction of wool fat acids.

While all of the metallic elements forming positive ions capable of readily combining with free halogen or hydrogen halide, when incorporated into poly(organic halide) compositions as their salts of wool fat acids, improve the heat and light stability of poly(organic halide) compositions, certain groups of metals form salts which impart more valuable properties of stability than the salts of other metals. For example, the metals which form substantially water insoluble halide salts, such as the silver group metals form wool fat acid salts having particularly valuable stabilizers for improving the dielectric and moisture resistant properties in addition to those of color and heat resistance. In general, the metals which readily form mono or divalent salts are not oxidized by the atmosphere under ordinary conditions, when employed as their wool fat acid salts, impart markedly improved resistance to thermochemically and photochemically induced changes in properties in poly(organic halide) compositions. However, certain tri and tetravalent metal wool fat acids salts in some cases also improve the thermostability of poly(organic halide) compositions. Illustrative examples of the individual metals which as their wool fat acid salts, particularly as the salts of the alcohol-soluble fraction of wool fat acids, impart improved heat and light stabilization to poly(organic halide) compositions include zinc, iron, cobalt, nickel, copper, chromium, manganese, lithium, sodium, potassium, rubidium, beryllium, magnesium, calcium, strontium, cadmium, barium, stanneous, thorium, arsenic, antimony, bismuth.

The metal wool fat acid salts are required in only minor amounts based on the weight of poly(organic halide) present in the compositions to provide a markedly improved stabilizer, in many cases as little as 1% by weight of wool fat acid metal salt based on the poly(organic halide)-content of the composition being sufficient. Since in general the metal salts of wool fat acids are by comparison more soluble in non-ionic organic materials, they may be employed in amounts which in comparison with the quantities of stabilization additive commonly employed heretofore are relatively large. However, when more than about 10% by weight based on the weight of poly(organic halide) is employed, the metal wool fat acid salt tends to act less and less as a stabilizing agent and more as a plasticizing agent. The employment of more than about 10% of the wool fat acid salt imparts to the composition but little more stability than a similar composition containing from about 3 to 7%, but serves to modify the properties of hardness, toughness, flexibility, and the like of the poly(organic halide) in an analogous fashion to the commonly employed plasticizers. Particularly suitable poly(organic halide) compositions have been prepared containing from about 3 to 5% of metal wool fat acids salts, and the compositions retained in general the same physical and chemical properties of similar unstabilized compositions but differing only by undergoing no changes in these properties over a much longer exposure to adverse conditions. When the metal wool fat acid salts are present in the preferred amounts, i. e., from about 3 to 5% by weight of the poly(organic halide)-content of the composition, the compositions are generally completely homogeneous and therefore transparent rather than opaque. Usually similar compositions containing the same amount of a less non-ionic solvent-soluble stabilizing agent exhibit a certain amount of opacity even before exposure to adverse conditions. In an opaque composition the light radiations are diffused and thus actually travel a longer path through the composition thereby subjecting it to the effects of more radiations for a given exposure. The transparent compositions generally obtained when the stabilizer consists of metal wool fat acid salts exhibit markedly improved resistance to the decolorizing effects of ultraviolet radiations.

The metal wool fat acid salt may be incorporated into the composition by any procedure suitable for dipersing an additive ingredient into a plastic composition. The wool fat acid salts may be powdered and incorporated during mixing on rollers, maxalating, or by any procedure suitable for the addition of a solid ingredient. The wool fat acid salt may be readily dissolved in any suitable organic solvent in which the polymer is also dissolved and precipitated in intimate mixture with the poly(organic halide) by the addition of a second solvent miscible with the first but immiscible with the polymer and the wool fat acid salts, as for example, by dissolving in acetone and precipitating with water. The precipitated polymer and stabilizing agent may then be freed of occluded solvents by any convenient procedure, such as by a drier or by milling on heated differential rollers. The wool fat acid salts may also be dissolved in the plasticizer and incorporated during the plasticizing operation, or may be incorporated during the introduction of pigments, dyes, or other compounding ingredients, or by still other suitable incorporating procedures which will be apparent to the man skilled in the art.

The stabilized poly(organic halide) compositions of the present invention are suitable for numerous applications for which such compositions have heretofore been considered unsatisfactory. For example, by virtue of their thermal stability the compositions of the invention are particularly suitable for manufacturing processes employing temperatures above those which have normally been considered the upper limit for poly(organic halide) compositions containing the stabilizing agents heretofore usually employed such as processes embodying hot-rolling into foils, extrusion molding into tubes, extrusion-pouring processes, and the like. By virtue of their high resistance to ultraviolet radiations as well as the solubility of the stabilizing agent in non-ionic solvents, the present compositions form improved ingredients for paints, varnishes, lacquers, and protective coatings.

In specialized applications, as for example, in the manufacturing of moisture resistant lacquers, films or foils, water repellant packaging materials, dielectric materials, and the like, which must withstand the effects of moisture as well as heat and light, the present compositions, particularly those containing the silver group metal salts of the alcohol soluble wool acid fraction, exhibit greatly improved periods of useful application. In these compositions the liberated halogen or hydrogen halide is combined by a reaction mechanism tending toward the formation of substantially water insoluble non-ionized solid salts rather than an ionic water-solubility salts within the mass of the plastic composition therefore dielectric properties of the compositions are substantially unaffected by conditions which would cause a serious weakening of the puncture potential of poly(organic halide) compositions containing the commonly employed stabilizing agents. The present compositions therefore form particularly valuable materials for employment in the manufacturing or treatment of electrical supplies such as condensers, coils, conduits, cable wrappings, and similar articles which must possess and maintain properties of homogeneity and resistance to changes in properties during the molding and impregnating operations, and during their use at elevated temperatures exposed to the effects of ultraviolet radiations and/or moisture.

*Example I.—The relative thermal stability of poly(organic halide) compositions containing various stabilizing additives*

Four polyvinylchloride containing roller foils were prepared under identical conditions. Three of the foils contained various stabilizing agents in amounts of approximately 3% by weight based on the polyvinylchloride-content of the composition and the fourth contained no stabilizing additions. The polyvinylchloride was obtained by an emulsion polymerization process, freed of emulsifier-residue by working with methyl alcohol and having an average osmometrically measured molecular weight of about 300,000.

In the preparation of each foil, 647 grams of the polyvinylchloride and 333 grams of dibutylphthalate plastizer was rolled together with 20 grams of the stabilizer, where a stabilizer was included, for a period of 10 minutes at a temperature of approximately 130° C. During the rolling procedure the unstabilized polyvinylchloride compositions turned a light yellow in color.

The various stabilizing additives employed were:

(1) A lead salt of salicylate acid containing approximately 37% by weight of lead.
(2) A lead salt of raw wool fat acids containing approximately 20.2% by weight of lead.
(3) A lead salt of the fraction of wool fat acids which was removed in the alcohol layer by the extraction of the raw wool fat acids with a binary mixture consisting of methyl alcohol and pentane.

Four identical sheets were cut from the various foils and heated in air at 335° F. The period of time required for the first sign of decomposition under this extreme temperature as well as the time required for the whole of each sheet to indicate decomposition was observed.

In a very few minutes on the unstabilized sheet the formation of dark brown spots was observed and not more than 15 minutes the entire sheet was dark brown and brittle.

Dark spots appeared in the sheet containing the lead salicylates after about 15 minutes exposure, and in an additional 15 minutes the entire sheet appeared brown.

The sheet containing the lead salts of raw wool fat acids required 45 minutes exposure before the appearance of the first brown spots and a subsequent additional 20 minutes before the spots covered the sheet.

The sheet stabilized by the lead salts of the alcohol soluble fraction of the wool fat acids required a full 90 minutes of exposure before the appearance of the first spot and a subsequent exposure fully as long as the other sheets before the brown spots spread over the entire surface.

*Example II.—The photochemical stability of poly(organic halide) compositions containing various stabilizing additives*

Three polyvinylchloride compositions were prepared in identical manners except that two of the compositions contained a stabilizing agent in the amount of 5% by weight of the polyvinylchloride content of the compositions by rolling together 100 parts by weight of polyvinylchloride, 60 parts plasticizing and flexibilizing additives, and were incorporated, 5 parts by weight of the various stabilizing additives. The stabilizing additives employed were basic lead carbonate and the lead salts of raw wool fat acids. Identical strips of the compositions were clamped to a turntable so that one portion of the strip was shielded from light. The strips rotating at about 20 R. P. M. and in a continuous draft of air to prevent excessive temperature risk were subjected to the direct radiations of a Hanovia mercury lamp placed at a distance of 12 inches from the strips for a period of 120 hours. A comparison of the exposed portion of each strip with the shaded portion of each revealed that the composition containing the lead wool fat acid salts was substantially unaffected by the ultra violet radiation while the composition containing basic lead carbonate was markedly discolored and the unstabilized composition still further discolored.

I claim as my invention:

1. A heat and light-stable homogeneous composition comprising polyvinyl halide resin and from 1 to 10%, in terms of the weight of said resin, of the salts of a metal selected from the group consisting of lead, silver and mercury with the mixture of acids obtained on saponification of wool fat.

2. The composition of claim 1 wherein the metal portion of said salts is lead.

3. A heat and light-stable homogeneous composition comprising polyvinyl halide resin and from 1 to 10%, in terms of weight of said resin, of the salts of a metal selected from the group consisting of lead, silver and mercury with that mixture of acids representing the methanol-soluble and pentane-insoluble fraction of the acid mixture obtained on saponification of wool fat.

4. The composition of claim 3 wherein the metal portion of said salts is lead.

5. A heat and light-stable homogeneous composition comprising polyvinyl halide resin and from 3 to 5%, in terms of the weight of said resin, of the salts of a metal selected from the group consisting of lead, silver and mercury with the mixture of acids obtained on saponification of wool fat.

6. A heat and light-stable homogeneous composition comprising polyvinyl chloride resin and from 3 to 5%, in terms of the weight of said resin, of the salts of a metal selected from the group consisting of lead, silver and mercury with the mixture of acids obtained on saponification of wool fat.

7. A heat and light-stable homogeneous composition comprising polyvinyl chloride resin and from 3 to 5%, in terms of the weight of said resin, of the lead salts of that mixture of acids representing the methanol-soluble and pentane-insoluble fraction of the acid mixture obtained on saponification of wool fat.

WILLEM LEENDERT JOHANNES DE NIE.

REFERENCES CITED

The following references are of record in the file of this patent:

UNITED STATES PATENTS

| Number | Name | Date |
|---|---|---|
| 2,075,543 | Reed et al. | Mar. 30, 1937 |
| 2,181,478 | Fligor | Nov. 28, 1939 |
| 2,267,778 | Yngve | Dec. 30, 1941 |
| 2,269,990 | Safford | Jan. 13, 1942 |

FOREIGN PATENTS

| Number | Country | Date |
|---|---|---|
| 525,048 | Great Britain | Aug. 20, 1940 |

OTHER REFERENCES

Ralston, Fatty Acids and Their Derivatives (1948), pp. 192-194.